United States Patent [19]

Kiss et al.

[11] Patent Number: 4,946,622
[45] Date of Patent: Aug. 7, 1990

[54] BLUE LUMINESCING GLASSES

[75] Inventors: Akos Kiss, Aschaffenburg; Peter Kleinschmit, Hanau; Werner Volker, Bad Vilbel; Gunter Halbritter, Schollkrippen, all of Fed. Rep. of Germany

[73] Assignee: Degussa Aktiengesellschaft, Frankfurt am Main, Fed. Rep. of Germany

[21] Appl. No.: 307,231

[22] Filed: Feb. 6, 1989

Related U.S. Application Data

[63] Continuation of Ser. No. 180,694, Apr. 8, 1988, abandoned, which is a continuation of Ser. No. 678,947, Dec. 6, 1984, abandoned.

[30] Foreign Application Priority Data

Dec. 23, 1983 [DE] Fed. Rep. of Germany ....... 3346685

[51] Int. Cl.$^5$ .................. C03C 8/10; C03C 3/105; C03C 3/108; C09K 11/08
[52] U.S. Cl. .................. 252/301.4 F; 501/22; 501/60; 501/61; 501/62; 501/74; 501/75
[58] Field of Search .................. 501/22, 60, 61, 62, 501/74, 75; 252/301.4 F

[56] References Cited

U.S. PATENT DOCUMENTS

| | | | |
|---|---|---|---|
| 2,097,275 | 10/1937 | Fischer | 501/61 |
| 2,314,804 | 3/1943 | Willson | 501/61 |
| 2,477,329 | 7/1949 | De Gier et al. | 501/61 |
| 2,734,142 | 2/1956 | Barnes | 501/61 |
| 3,258,351 | 6/1966 | Paymal | 501/61 |
| 3,416,937 | 12/1968 | Enomoto | 501/61 |
| 3,728,646 | 4/1973 | Zijlstra | 501/61 |
| 3,799,784 | 3/1974 | Takeuchi | 501/61 |
| 4,319,215 | 3/1982 | Yamazaki et al. | 501/61 |
| 4,476,090 | 10/1984 | Heidsiek et al. | 501/22 |
| 4,532,221 | 7/1985 | Barlier et al. | 501/22 |
| 4,542,105 | 9/1985 | Furukawa et al. | 501/22 |

FOREIGN PATENT DOCUMENTS

| | | | |
|---|---|---|---|
| 49-35043 | 9/1974 | Japan | 501/61 |
| 50-92915 | 7/1975 | Japan | 501/61 |
| 51-31802 | 9/1976 | Japan | 501/60 |
| 52-38521 | 3/1977 | Japan | 501/61 |
| 58-84142 | 5/1983 | Japan | 501/61 |
| 544625 | 2/1977 | U.S.S.R. | 501/61 |
| 1492532 | 11/1977 | United Kingdom | 501/61 |

OTHER PUBLICATIONS

Kriedl, N. J.; "Recent Studies on the Fluorescence of Glass", Journal of the Optical Society of America, vol. 35, No. 4, Apr. 1945, pp. 249–257.

Primary Examiner—Mark L. Bell
Attorney, Agent, or Firm—Cushman, Darby & Cushman

[57] ABSTRACT

There are described blue luminescent glasses having the following compositions
(a) 0 to 90 mole % alkali metal oxide (sodium oxide, potassium oxide, lithium oxide), individually or several together, 0 to 90 mole % alkaline earth metal oxide (magnesium oxide, calcium oxide, strontium oxide, barium oxide), individually or several together, with the proviso that the magnesium oxide and/or calcium oxide can only be present in an amount of up to 25 mole % and at least 2 mole % of alkali metal oxide and/or alkaline earth metal oxide must be present
(b)
  7 to 95 mole % silica
  0 to 70 mole % boron oxide ($B_2O_3$)
  0 to 85 mole % aluminum oxide
(c) 0.01 to 40 mole % lead oxide (PbO).

1 Claim, No Drawings

BLUE LUMINESCING GLASSES

This is a continuation of Application Ser. No. 07/180,694, filed April 8, 1988, abandoned, which was abandoned upon the filing hereof, which in turn is a continuation of No. 678,947, filed Dec. 6, 1984, which is now abandoned.

BACKGROUND OF THE INVENTION

The invention is directed to blue luminescent glasses, especially blue luminescent glass frits for glazing ceramic products.

Luminophores or fluoroscent substances are materials which are capable after absorbing energy (daylight, ultraviolet rays, x-rays, etc.) of emitting light. This light emission takes place with longer wave lengths than the absorbed radiation has and occurs during the excitation itself and in differing time intervals subsequently.

According to prevailing opinion the fluorescent substances are solid, crystalline compounds in which several cations of the base material are replaced by foreign cations, whereby the built in cations with the surrounding group of anions are conceived as so-called luminous centers. By comminuting the luminescent substance crystallite the ability to luminesce of the known luminophores is completely destroyed.

Amorphous materials with luminescent substance properties theoretically do not exist. Glass-like luminescent materials therefore previously have not been known.

For the product, for example of tiles having luminescent glaze coatings until now there have been fired mixtures of crystalline luminescent materials and customary glass frits. Thereby there cannot be exceeded temperatures of 700° to 800° C. since at higher temperatures which are necessary for firing on interesting glass frits, the luminescing materials are destroyed and no longer exhibit luminescent material properties.

Therefore it was the problem of the present invention to develop blue luminescing glasses, especially blue luminescing glass frits for glazing ceramic products.

SUMMARY OF THE INVENTION

This problem was solved according to the invention by glasses having the following compositions (a) 0 to 90 mole % alkali metal oxide (sodium oxide, potassium oxide, lithium oxide), individually or several together, 0 to 90 mole % alkaline earth metal oxide (magnesium oxide, calcium oxide, strontium oxide, barium oxide), individually or several together, with the proviso that the magnesium oxide and/or calcium oxide can only be present in an amount of up to 25 mole % and at least 2 mole % of alkali metal oxide and/or alkaline earth metal oxide must be present (b)
7 to 95 mole % silica
0 to 70 mole % boron oxide ($B_2O_3$)
0 to 85 mole % aluminum oxide (c)
0.01 to 40 mole % lead oxide (PbO).

Contrary to prevailing opinion, according to which only crystalline compounds are able to possess luminescent properties, these x-ray amorphous glasses surprisingly likewise exhibit luminescent properties, even if they are present in the form of glass frits.

These glasses absorb the mercury line 254 nm and unit a band in the blue region with the band maximum at 420 nm ($\Delta\lambda = \pm 2$) and a band width of the band at 50 percent down of approximately 35 nm.

The luminescing glasses or frits are temperature stable, acid resistant, do not lose their luminescent properties upon comminution, are transparent and colorless in daylight. Besides they can be colored.

Preferably there are used glasses of the following compositions (a)
0 to 60 mole % alkali metal oxide
0 to 25 mole % alkaline earth metal oxide, whereby at least
3 mole % alkali and/or alkaline earth metal oxide must be present (b)
40 to 90 mole % silica
0 to 50 mole % boron oxide
0 to 50 mole % aluminum oxide (c)
0.1 to 10 mole % lead oxide.

There have proven especially preferred the following glass compositions (a)
2 to 45 mole % alkali metal oxide and/or
1 to 20 mole % alkaline earth metal oxide (b)
60 to 85 mole % silica
5 to 30 mole % boron oxide
1 to 15 mole % aluminum oxide (c)
0.5 to 5 mole % lead oxide.

The production of the glasses of the invention is carried out by melting together the components or corresponding raw products (e.g. kaolin, feldspar, silica) at a temperature of 1300 to 1450° C. in a suitable furnace (gas furnace, rotary furnace, electric glass melting furnace) for 0.5 to hours. To produce glass frits, the product is quenched in water.

Through variation of the alkali and/or alkaline earth metal oxide and their contents the color of the luminescence can be varied to a small extent.

The composition can comprise, consist essentially of, or consist of the stated materials.

The following glasses were produced according to these processes

EXAMPLE 1
2.34 mole % $Li_2O$, 5.35 mole % $Na_2O$, 6.36 mole % $K_2O$, 4.35 mole % MgO, 6.01 mole % CaO, 1.34 mole % SrO, 1.02 mole % BaO, 1.61 mole % $Al_2O_3$, 9.71 mole % $B_2O_3$, 60.91 mole % $SiO_2$, and 1.00 mole % PbO.

EXAMPLE 2
17.0 mole % $K_2O$, 81.6 mole % $SiO_2$, 1.4 mole % PbO.

EXAMPLE 3
20.0 mole % $K_2O$, 43.7 mole % $B_2O_3$, 35.0 mole % $SiO_2$, 1.3 mole % PbO.

EXAMPLE 4
20.0 mole % $K_2O$, 58.5 mole % $Al_2O_3$, 20.0 mole % $SiO_2$, 1.5 mole % PbO.

EXAMPLE 5
21.2 mole % $Na_2O$, 77.5 mole % $SiO_2$, 1.3 mole % PbO.

EXAMPLE 6
15.0 mole % $Li_2O$, 83.5 mole % $SiO_2$, 1.5 mole % PbO.

EXAMPLE 7
25.0 mole % BaO, 73.5 mole % $SiO_2$, 1.5 mole % PbO.

EXAMPLE 8
27.2 mole % $SrO_2$, 71.3 mole % $SiO_2$, 1.5 mole % PbO.

EXAMPLE 9
20.0 mole % CaO, 30.0 mole % $B_2O_3$,
47.5 mole % $SiO_2$, 2.5 mole % PbO.

EXAMPLE 10
2.5 mole % $Li_2O$, 3.5 mole % $Na_2O$, 15.0 mole % $K_2O$, 2.0 mole % CaO, 2.5 mole % $Al_2O_3$, 5.5 mole % $B_2O_3$, 68.5 mole % $SiO_2$, 0.5 mole % PbO.

EXAMPLE 11
2.0 mole % $Na_2O$, 14.0 mole % $K_2O$, 1.5 mole % SrO, 2.5 mole % BaO, 5.0 mole % $Al_2O_3$, 5.3 mole % $B_2O_3$, 67.0 mole % $SiO_2$, 2.7 mole % PbO.

EXAMPLE 12
10.5 mole % $K_2O$, 1.5 mole % MgO, 2.5 mole % CaO, 1.0 mole % $Al_2O_3$, 8.0 mole % $B_2O_3$, 73.5 mole % $SiO_2$, 3.0 mole % PbO.

EXAMPLE 13
11.0 mole % $K_2O$, 10.4 mole % $B_2O_3$, 77.3 mole % $SiO_2$, 1.5 mole % PbO.

EXAMPLE 14
20.0 mole % $K_2O$, 58.5 mole % $Al_2O_3$, 20.0 mole % $SiO_2$, 1.5 mole % PbO.

Especially nice luminescing glasses are obtained with the following compositions
2 to 15 mole % $Na_2O$ and $K_2O$, 1 to 3 mole % $Al_2O_3$,
7 to 12 mole % $B_2O_3$, 71 to 82 mole % $SiO_2$ and 0.8 to 1.8 mole % PbO.

What is claimed is:

1. An amorphous blue luminescent glass capable of absorbing radiation at 254 nm and emitting radiation at 420 nm ($\Delta\lambda = \pm 2$ nm) and a band width of the band at 50 percent down of approximately 35 nm, said glass consisting of the following:

2-15 mole % $Na_2O$, $K_2O$ or a mixture of $Na_2O$ and $K_2O$,
1 to 3 mole % $Al_2O_3$,
7 to 12 mole % $B_2O_3$,
71-82 mole % $SiO_2$ and
0.8 to 1.8 mole % PbO.

* * * * *